(12) United States Patent
Wey

(10) Patent No.: US 11,138,456 B2
(45) Date of Patent: Oct. 5, 2021

(54) SYSTEM AND METHOD FOR ENSURING CREATION OF AUTHENTIC ONLINE PROFILES

(71) Applicant: Brandon Wey, Las Vegas, NV (US)

(72) Inventor: Brandon Wey, Las Vegas, NV (US)

( * ) Notice: Subject to any disclaimer, the term of this patent is extended or adjusted under 35 U.S.C. 154(b) by 160 days.

(21) Appl. No.: 13/940,258

(22) Filed: Jul. 12, 2013

(65) Prior Publication Data

US 2015/0015689 A1    Jan. 15, 2015

(51) Int. Cl.
*G06K 9/00* (2006.01)

(52) U.S. Cl.
CPC ..... *G06K 9/00912* (2013.01); *G06K 9/00335* (2013.01); *G06K 9/00899* (2013.01)

(58) Field of Classification Search
None
See application file for complete search history.

(56) References Cited

U.S. PATENT DOCUMENTS

| | | | | |
|---|---|---|---|---|
| 7,809,169 B2* | 10/2010 | Martinez | ............. | G06Q 20/367 235/379 |
| 8,910,251 B2* | 12/2014 | Shepard | ................. | G06F 21/31 726/18 |
| 2003/0163708 A1* | 8/2003 | Tang | .................... | G06Q 20/341 713/185 |
| 2006/0056666 A1* | 3/2006 | Mizutani | ........... | G07C 9/00158 382/118 |
| 2009/0319270 A1* | 12/2009 | Gross | ..................... | G10L 17/26 704/246 |
| 2012/0130714 A1* | 5/2012 | Zeljkovic | ............... | G10L 17/24 704/235 |
| 2012/0140993 A1* | 6/2012 | Bruso | ............... | G06K 9/00899 382/118 |
| 2012/0180115 A1* | 7/2012 | Maitland | ................ | G06F 21/34 726/7 |
| 2012/0216260 A1* | 8/2012 | Crawford | ............... | G06F 21/31 726/5 |
| 2012/0253809 A1* | 10/2012 | Thomas | ................. | G10L 17/24 704/246 |
| 2013/0219480 A1* | 8/2013 | Bud | ....................... | G06F 21/32 726/7 |
| 2014/0009560 A1* | 1/2014 | Krishnan | .............. | H04M 3/436 348/14.03 |
| 2015/0055822 A1* | 2/2015 | Zhou | ...................... | G06F 3/017 382/103 |

* cited by examiner

*Primary Examiner* — Vikkram Bali
(74) *Attorney, Agent, or Firm* — Michael Downs; Downs IP Law LLC

(57) ABSTRACT

A method and system are provided for ensuring creation of authentic online profiles. The method includes providing an option to a user for enabling capturing of digital media depicting the user's appearance. Further, digital media using a camera associated with a user device is captured, if the user chooses to allow the capturing of digital media. Furthermore, at least one instruction is communicated to the user for performing one or more actions. Subsequently, the captured digital media is transmitted for verification, without allowing the user to modify the captured digital media. Thereafter, the captured digital media is verified by analyzing the captured digital media for approving or rejecting the captured digital media.

18 Claims, 6 Drawing Sheets

SYSTEM AND METHOD FOR ENSURING CREATION OF AUTHENTIC ONLINE PROFILES

CROSS-REFERENCE TO RELATED APPLICATIONS

This application claims priority from the earlier filed U.S. Provisional Application No. 61/670,525

STATEMENT REGARDING FEDERALLY SPONSORED RESEARCH AND DEVELOPMENT

Not applicable.

BACKGROUND

Field of the Invention

This application relates generally to the field of identity verification and, more particularly but not exclusively, to ensuring creation of authentic online profiles.

Discussion of Related Field

With the advent of social networking websites and dating websites, among other, users of all age groups across the globe are able to communicate with each other by registering on such websites. The registration process on these websites normally involves the users providing information about them and uploading their photographs.

Such websites are used for networking in various contexts. It is normal human tendency to make a decision based on the appearance of the person in establishing contact with an unfamiliar person. In case of the aforementioned websites, the photographs uploaded by the users are most often the only way of knowing about users' appearance. While photographs play a vital role in making such decisions, it is observed that many users provide photographs, which do not depict their true appearance. Such users provide photographs that are either not theirs or provide old photographs. The instant practice hampers the widespread acceptance of such websites.

One of the conventional approaches tries to address the above problem by allowing the user to upload his/her photograph by holding a piece of paper with some unique message written on it. This method is not fool proof, since the photograph can easily be edited using a photo editing software, such as Photoshop.

A number of photograph verification services, such as PhotoVerified.com tries to solve the problem by asking users to crumple up the paper, so that it is harder to be edited using a photo editing software. However, this approach requires users to write a unique message on a piece of paper, hold it in front of a camera and upload the photograph. This is a multi-step approach that is tedious and may not be perceived as user friendly. If an approach is not seamless, user adoption may be low, since few people will opt to use it.

In light of the foregoing discussion, there is a need for a technique that is user friendly, seamless and fool-proof to verify that the person using an online profile, is in fact the person who is visually depicted in the photographs or videos associated with the profile on a specific date and time.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

An embodiment provides a method for ensuring creation of authentic online profiles. The method includes providing an option to a user for enabling capturing of digital media depicting the user's appearance. Further, digital media using a camera associated with a user device is captured, if the user chooses to allow the capturing of digital media. Furthermore, at least one instruction is communicated to the user for performing one or more actions. Subsequently, the captured digital media is transmitted for verification, without allowing the user to modify the captured digital media. Thereafter, the captured digital media is verified by analyzing the captured digital media for approving or rejecting the captured digital media.

In another embodiment, a system for ensuring creation of authentic online profiles is provided. The system is configured to provide an interface that offers a user with an option for enabling capturing of digital media depicting the user's appearance. Further, the system enables capturing digital media using a camera associated with a user device, if the user chooses to allow the capturing of digital media. Furthermore, the system communicates at least one instruction to the user to perform one or more actions. Subsequently, the system receives the captured digital media for verification without allowing the user to modify the captured digital media, wherein the digital media is received by a verification module. Thereafter, the system enables verification of the captured digital media by analyzing the captured digital media for approving or rejecting the captured digital media.

These and other advantages of the present invention will be clarified in the description of the embodiments taken together with the attached drawings in which like reference numerals represent like elements throughout.

BRIEF DESCRIPTION OF DRAWINGS

Embodiments are illustrated by way of example and not limitation in the Figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Embodiments disclose techniques for ensuring creation of authentic online profiles. The techniques may be used when users upload their photographs or videos to create online profiles and where verification of such photographs to ensure their authenticity is desired.

Figure 1:
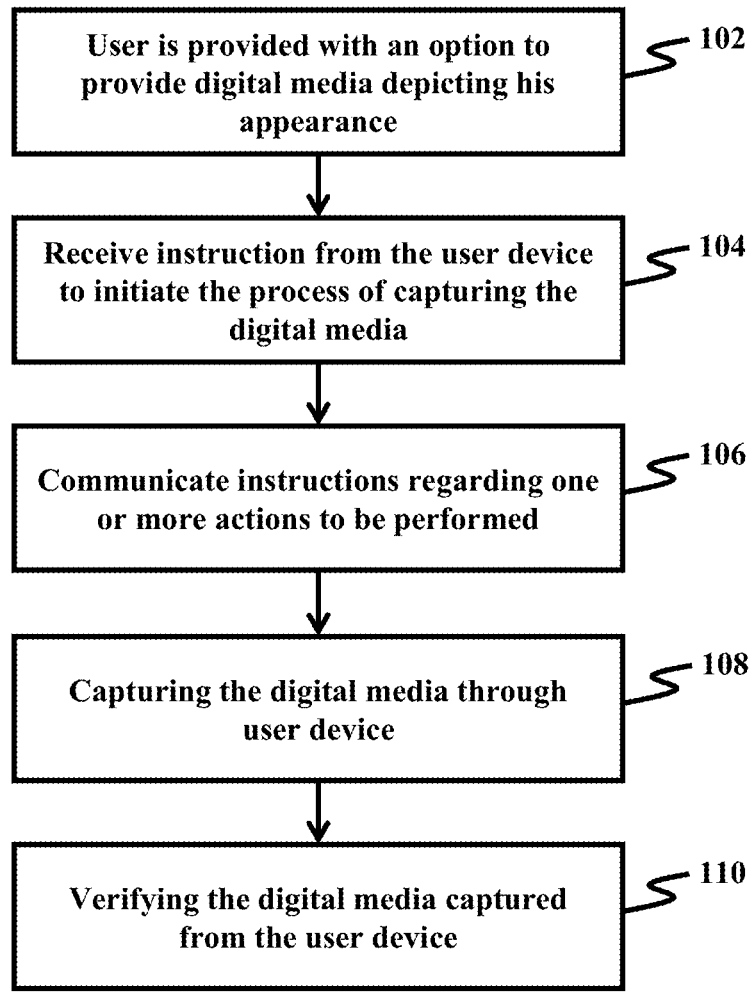
FIG. 1 is a flow chart illustrating a method for ensuring creation of authentic online profiles, in accordance with an embodiment.

FIG. 1 is a flow chart illustrating a method for ensuring creation of authentic online profiles, in accordance with an embodiment. At step 102, a user is provided with an option to provide digital media depicting his appearance. The digital media can be one or more photographs or one or more videos. Subsequently, an instruction may be received from the user through his device to initiate the process of capturing the digital media, at step 104. Thereafter, at step 106, instructions regarding one or more actions to be performed are communicated to the user. At step 108, the digital media is captured using the user device. The digital media is transmitted for verification without allowing the user to modify the digital media. The captured digital media is verified at step 110. The verification is based on whether the instructions were carried out by the user successfully. Additionally, the verification may be based on whether or not the user was visible to a satisfactory extent in the captured digital media. If the verification is positive, the digital media is approved.

Figure 2:
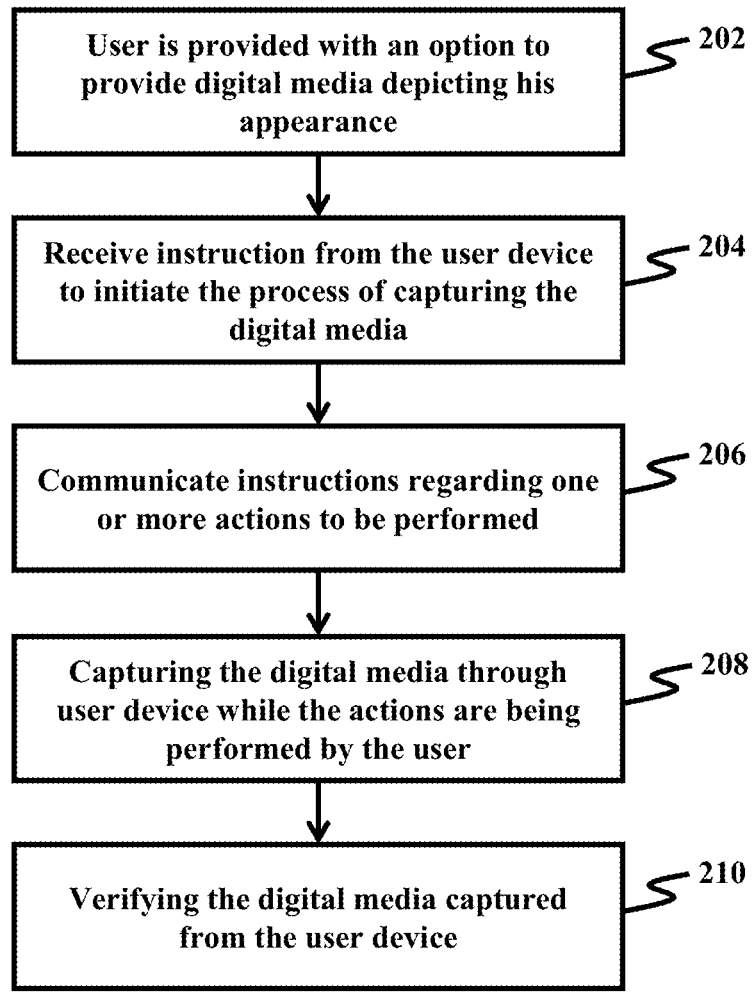
FIG. 2 is a flow chart illustrating a method of providing all the instructions prior to capturing the digital media from the user device, in accordance with an embodiment.

In an embodiment, the user performs the one or more actions after receiving all the instructions regarding one or more actions to be performed. FIG. 2 is a flow chart illustrating a method of providing all the instructions prior to capturing the digital media from the user device, in accordance with an embodiment. At step 206, the instructions are communicated to the user. Thereafter, at step 208, digital media is captured while the user performs the action(s) provided in the instructions. It may be noted that, the user may be provided with a choice of instructions. After the user chooses an instruction, the user may be provided a timeframe to perform the actions in the instruction, while the digital media is being captured.

Figure 3:
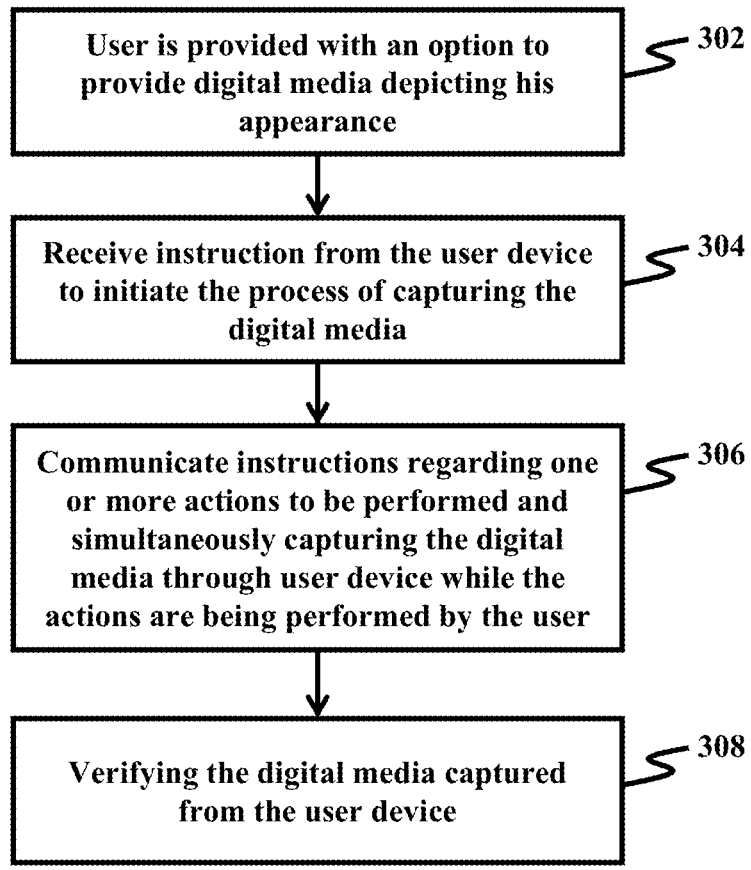
FIG. 3 is a flow chart illustrating a method of providing instructions and simultaneously capturing digital media while the actions in the instructions are being performed, in accordance with an embodiment.

In an embodiment, the user performs the one or more actions while the instructions regarding the one or more actions are being relayed to the user. FIG. 3 is a flow chart illustrating a method of providing instructions and simultaneously capturing digital media while the actions in the instructions are being performed, in accordance with an embodiment. At step 306, instructions regarding one or more actions to be performed are relayed to the user. The user performs the actions according to the instructions being relayed to the user, while digital media is being captured. It may be noted that, the user may be provided with a choice of instructions. After the user chooses an instruction, the instruction is relayed to the user.

Figure 4:
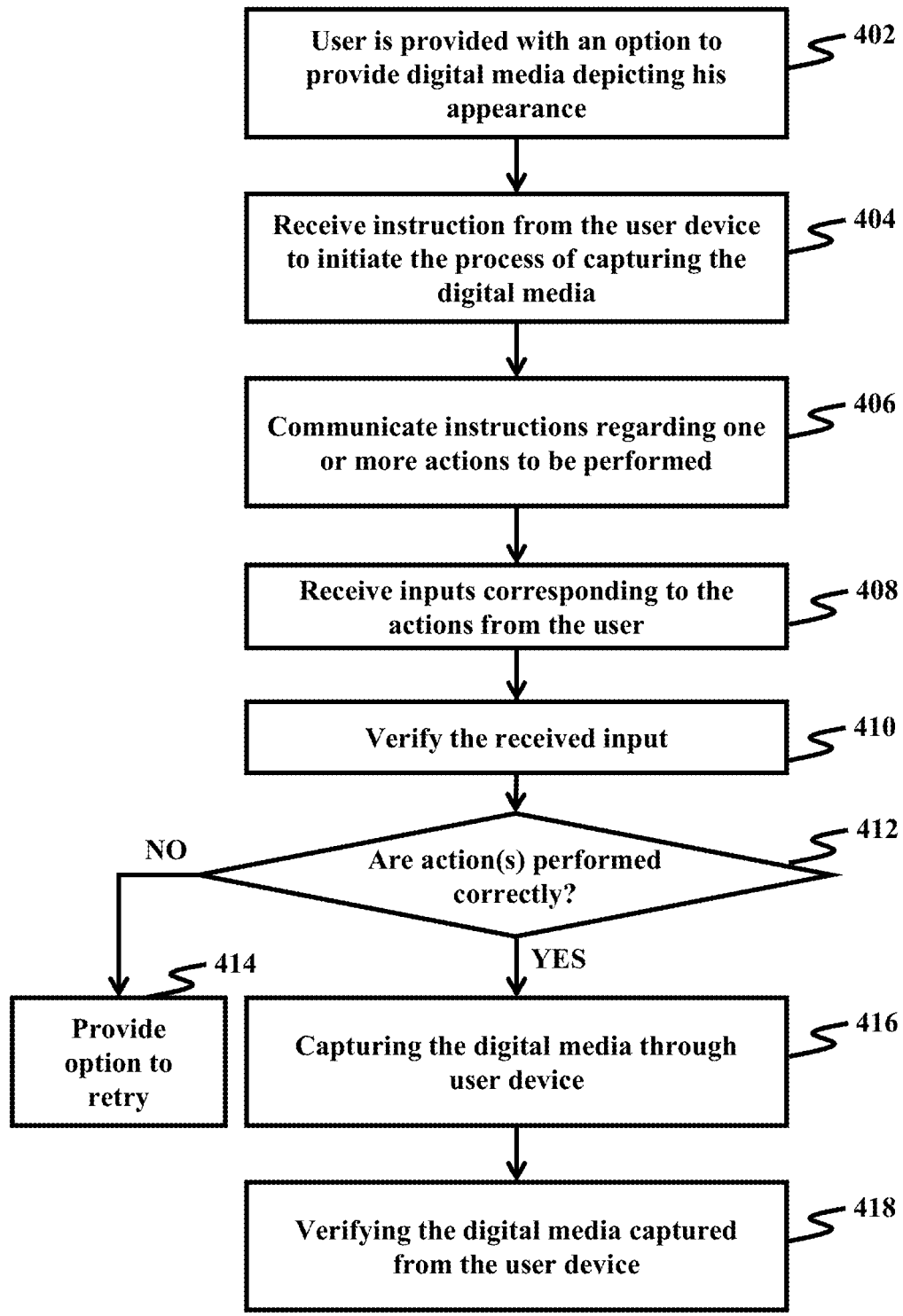
FIG. 4 is a flow chart illustrating a method of receiving the instructions regarding the actions to be performed and capturing the digital media after the action(s) are performed, in accordance with an embodiment.

In an embodiment, the user performs one or more actions after receiving all the instructions regarding the actions to be performed, and the digital media is captured after the action(s) are performed. FIG. 4 is a flow chart illustrating a method of receiving the instructions regarding the actions to be performed and capturing the digital media after the action(s) are performed, in accordance with an embodiment. At step 406, the instructions are communicated to the user. Thereafter, at step 408, inputs corresponding to the actions performed by the user are received. In an embodiment, only if the actions performed are successfully verified, digital media is captured using the user device. Further, in another embodiment, the verification of the performed actions is carried out after capturing the digital media using the user device.

In an embodiment, instructions communicated to the user may include instructions to read out one or more, words or numbers.

In an embodiment, instructions communicated to the user may include instructions to make one or more gestures. The gestures may also be made using one or more objects as specified in the instructions.

In an embodiment, instructions communicated to the user may include instructions to input alphanumeric characters, which corresponds to fulfilling a challenge-response (CAPTCHA) requirement.

In an embodiment, the user is provided with an option to review the digital media that is captured prior to the same being subjected to verification. If the user is not satisfied with the captured digital media, the user may reinitiate the process.

In an embodiment, the user is provided with an option to select among the photographs (digital media) that are captured, which he wishes to associate with his online profile, post successful verification.

Figure 5:
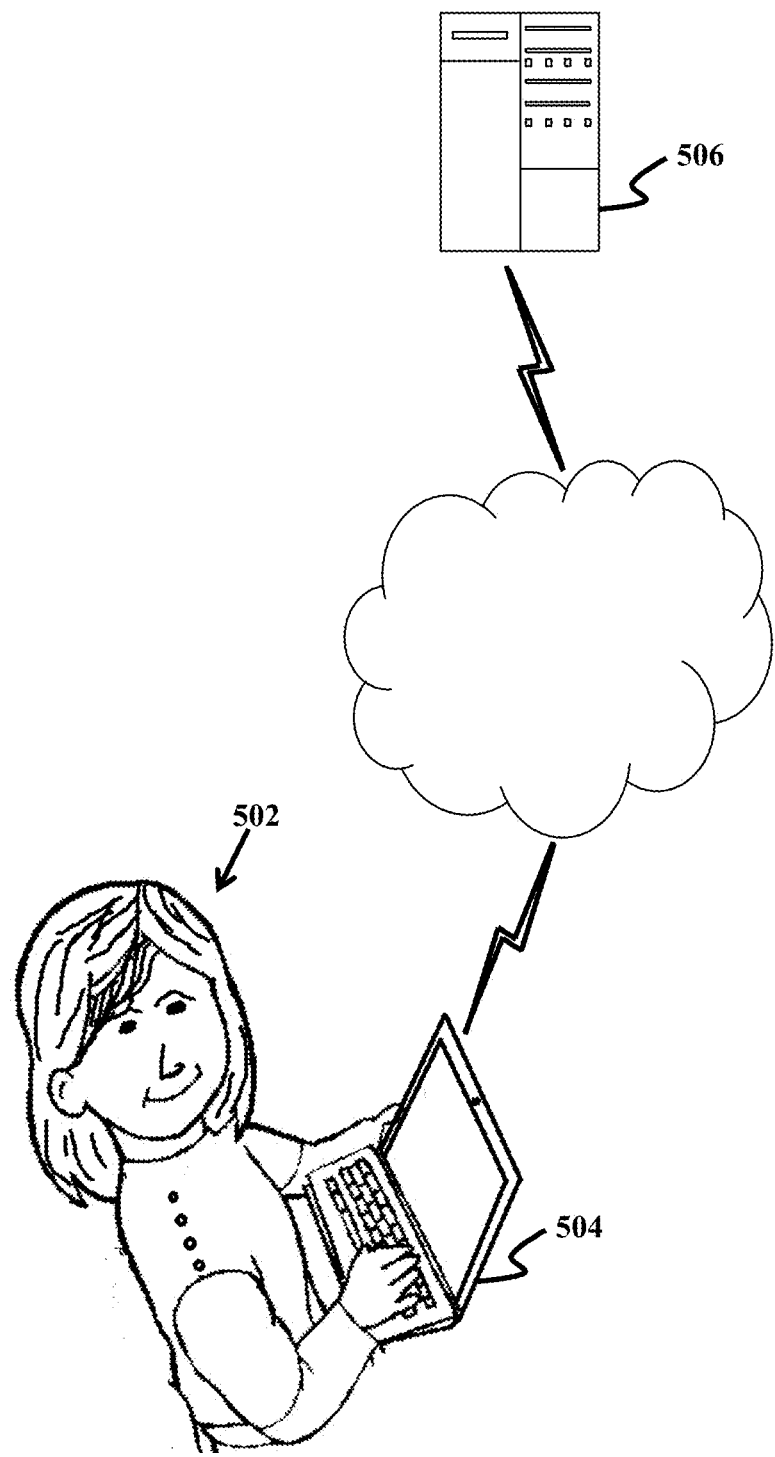
FIG. 5 illustrates capturing of digital media from the user device and communicating the same to the remote location in accordance with an embodiment.

In an embodiment, the digital media captured through the user device is verified at a remote location. FIG. 5 illustrates capturing of digital media using the user device and communicating the same to the remote location, in accordance with an embodiment. The captured digital media of the user 502 using the user device 504 is transferred to a remote location. The remote location includes a server 506, which has a verification module. The verification module facilitates verification of the digital media captured using the user device 504. The verification module is part of a system that is configured to authenticate online profiles.

Figure 6:
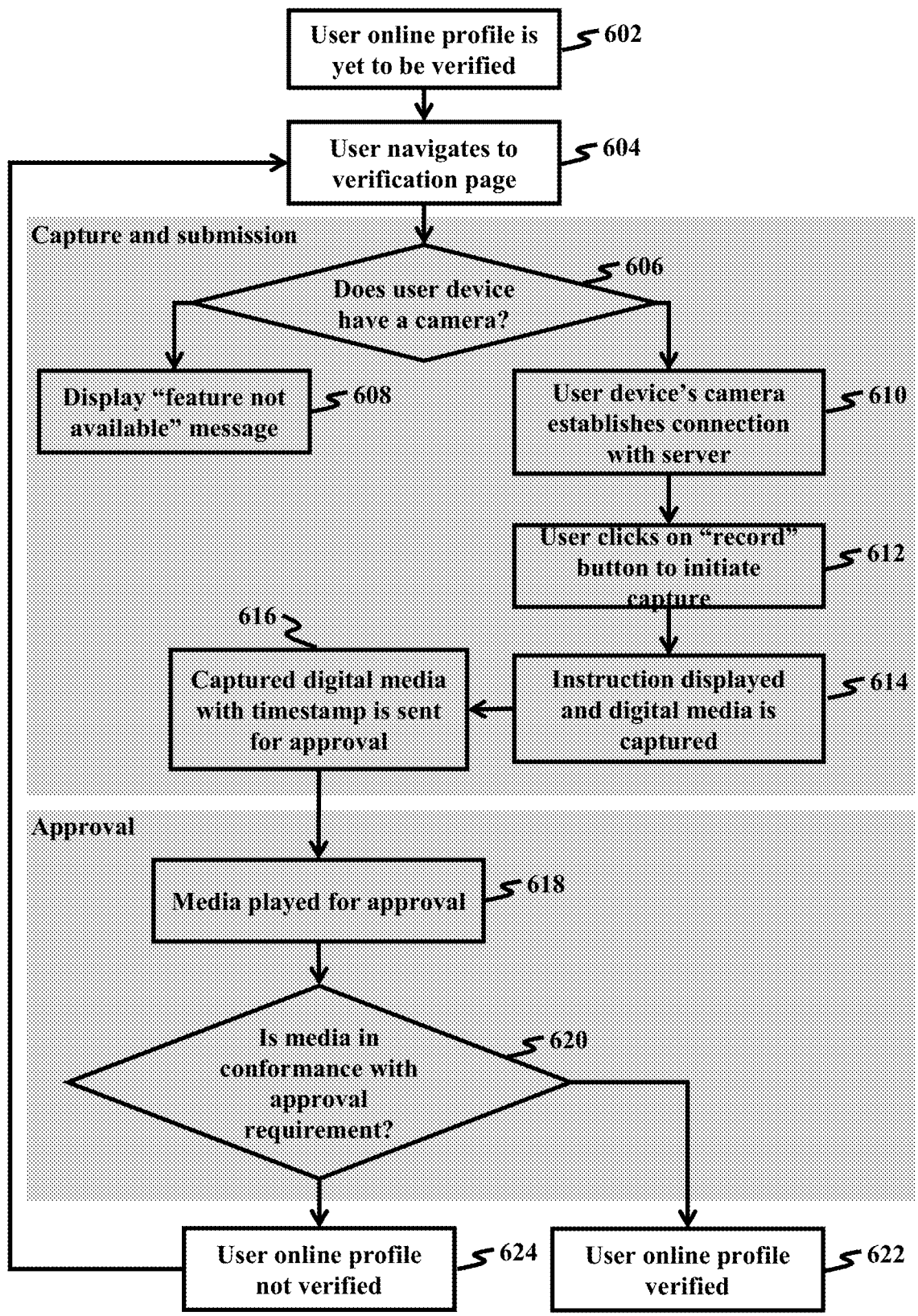
FIG. 6 is a flow chart illustrating an exemplary embodiment for verifying the digital media at a remote location

FIG. 6 is a flow chart illustrating an exemplary embodiment for verifying the digital media at a remote location. At step 602, a user profile is yet to be verified. The user may proceed to step 604 to begin the verification process by invoking or executing a verification software or application or web-page. At step 606, the system ascertains whether a camera exists or is enabled on the user device. If the system fails to ascertain the accessibility to the camera on the user device, then a message communicating the same is displayed at step 608. The user may be enabled to resolve the instant issue by displaying instructions on how to troubleshoot the problem. If the system establishes communication with the camera, at step 610, connection is established between the camera and the server 506. It may be noted that, guidance may also be provided to the user in the form of a text description, pictorial description or video with detailed explanation to complete the digital media capturing step. At step 612, once the user is familiar with the kind of instructions and digital media capturing process, the user will initiate capturing of digital media by clicking on a "Record" button. A timer may also be provided for the user to keep track of the recoding time and thereby limiting the capture time. At step 614, while the recording is going on, the system will display one or more instructions (e.g., asking the user to make a gesture, recite a certain text, entering a CAPTCHA, etc.) and captures all the actions performed by the user for a specified period of time through the user device. At step 614, in case the instructions are such that, the user is requested to input some data, an interface may also be provided on the user interface to accept the data from the user. After the digital media is captured, the same may be displayed to the user. If the user is unhappy with the captured digital media, the user may repeat the capturing process. In the event of the digital media being recorded again, the instructions displayed may be changed. If the captured digital media is acceptable to the user, step 616 is invoked. At step 616, the captured digital media, along with a timestamp, indicating the date and time of the captured digital media, is saved on to the server 506. The saved digital media is submitted into a queue for an administrator of the website for review.

At step 618, the verification module of the server displays the digital media to the administrator along with the instructions that were displayed to the user, during the step 614. Analyzing the digital media along with the instructions, the administrator has to make a decision in step 620, as to approve or reject the digital media. If the video meets all the approval requirements, the administrator will approve the profile in step 624. However, if the digital media does not meet all the requirements for approval, at step 622, the administrator may reject the digital media and provide a reason for such rejection. Such a reason for rejection may be communicated to the user, so that corrective action may be taken by the user. Once rejected, the profile (digital media associated with the profile) will remain unverified as in step 602, and the user may have to repeat the verification process all over again.

In an embodiment, the verification of the digital media is carried out with minimal or no involvement of the administrator. In this embodiment, an analysis module, which may include machine learning algorithm, is used for verifying the digital media. The digital media is fetched from the verification module, and the corresponding instructions are used to carry out the analysis.

In an embodiment, if the analysis module rejects the digital media, then the digital media may be analyzed by an administrator.

In an embodiment, the verification of the digital media is carried out at the user device. In this embodiment, the verification and analysis modules are stored on the user device, such that verification can be carried out at the user device. Further, the analysis module may be updated as and when required to enable verification of the digital media.

The user device can be a data processing system which includes a camera. The data processing system, can be, for example a desktop computer configured with a camera, a camera enabled laptop or a camera enabled communication device.

In an embodiment, capturing of digital media is used to verify progress corresponding to one or more tasks assigned to a user. The location of the user device 504 used to capture the digital media is determined. The location of the user device 504 can be determined based on the GPS location of the user device 504. Further, the instruction provided to the user to record digital media can include, instruction to record a specific area. Furthermore, the recorded digital media is transmitted for verification along with the date and time of recording the digital media and location of the user device 504. The progress corresponding to one or more tasks assigned to a user is verified using the digital media that captures the specific area, date and time of capturing the digital media and the location of the user device 504 that captured the digital media.

In an embodiment, the specific area is an area in which one or tasks has to be preformed, such as, for example, painting and plumbing.

In an embodiment, the specific area is the house/building number display.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and/or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

What is claimed is:

1. A method for ensuring creation of authentic online profiles, the method comprising:
   providing, via a user device, an option to a user for enabling capturing of digital media depicting the user's appearance;
   capturing digital media using a camera associated with the user device, wherein capturing digital media comprises recording a video of the user;
   prior to recording the video of the user, communicating a first instruction to the user to perform a first action,
      wherein recording the video of the user comprises recording the user performing the first action;
   while recording the video of the user, communicating, via the user device, at least one second instruction to the user to perform one or more second actions,
      wherein each at least one second instruction is different from the first instruction,
      wherein each one or more second action is different from the first action, and wherein recording the video of the user comprises recording the user performing the one or more second actions;

transmitting, via the user device to a server, the captured digital media for verification, without allowing the user to modify the captured digital media, the captured digital media comprising the recorded video of the user, the recorded video including the performing of the first action and the performing of the one or more second actions; and verifying, using a verification module of the server, the captured digital media by analyzing the captured digital media, wherein verifying comprises:
  accessing the captured digital media comprising the recorded video;
  accessing the first instruction that was communicated to the user prior to recording the video of the user;
  accessing the at least one second instruction that was communicated to the user while recording the video of the user;
  reviewing, using an analysis module of the server, the recorded video to determine, based on the first instruction that was communicated to the user prior to recording the video of the user and the at least one second instruction that was communicated to the user while recording the video of the user, whether the user performed the first action and the one or more second actions correctly; and
  performing one of the following:
    approving the captured digital media if the user performed the first action and the one or more second actions correctly, or
    rejecting the captured digital media if the user did not perform the first action and the one or more second actions correctly.

2. The method according to claim 1, wherein at least one of the first instruction and the at least one second instruction comprises instructing the user to read out one or more, words or numbers, while the digital media is captured.

3. The method according to claim 1, wherein at least one of the first instruction and the at least one second instruction comprises instructing the user to make one or more gestures.

4. The method according to claim 3, wherein the one or more gestures are instructed to be made using one or more objects.

5. The method according to claim 1, wherein at least one of the first instruction and the at least one second instruction comprises instructing the user to fulfill a challenge-response requirement.

6. The method according to claim 1, wherein the user is provided with a choice of instructions.

7. The method according to claim 1, wherein verifying is performed at a remote location that is remote from the user.

8. The method according to claim 7, wherein transmitting comprises transmitting the captured digital media to the server at the remote location.

9. A system for ensuring creation of authentic online profiles, wherein the system comprises:
  a user device; and
  a server in communication with the user device, the server being configured to:
    provide an interface via the user device that offers a user with an option for enabling capturing of digital media depicting the user's appearance;
    enable capturing digital media using a camera associated with the user device, wherein capturing digital media comprises recording video of the user;
    prior to recording the video of the user, communicate a first instruction to the user to perform a first action, wherein recording the video of the user comprises recording the user performing the first action;
    while recording a video of the user, communicate, via the user device, at least one second instruction to the user to perform one or second more actions,
      wherein each at least one second instruction is different from the first instruction,
      wherein each one or more second action is different from the first action, and
      wherein recording the video of the user comprises recording the user performing the one or more second actions;
    receive, from the user device, the captured digital media for verification without allowing the user to modify the captured digital media, wherein the digital media is received by a verification module of the server, the captured digital media comprising the recorded video of the user, the recorded video including the performing of the first action and the performing of the one or more second actions; and
    verify the captured digital media by analyzing the captured digital media for approving or rejecting the captured digital media,
    wherein verifying comprises:
      accessing the captured digital media comprising the recorded video;
      accessing the first instruction that was communicated to the user prior to recording the video of the user:
      accessing the at least one second instruction that was communicated to the user while recording the video of the user;
      reviewing the recorded video using an analysis module of the server to determine, based on the first instruction that was communicated to the user prior to recording the video of the user and the at least one second instruction that was communicated to the user while recording the video of the user, whether the user performed the first action and the one or more second actions correctly; and
      performing one of the following:
        approving the captured digital media if the user performed the first action and the one or more second actions correctly, or
        rejecting the captured digital media if the user did not perform first action and the one or more second actions correctly.

10. The system according to claim 9, wherein at least one of the first instruction and the at least one second instruction comprises instructing the user to read out one or more, words or numbers, while the digital media is captured.

11. The system according to claim 9, wherein at least one of the first instruction and the at least one second instruction comprises instructing the user to make one or more gestures.

12. The system according to claim 11, wherein the one or more gestures are instructed to be made using one or more objects.

13. The system according to claim 9, wherein at least one of the first instruction and the at least one second instruction comprises instructing the user to fulfill a challenge-response requirement.

14. The system according to claim 9, wherein the system is configured to provide the user with a choice of instructions.

15. The system according to claim 9, wherein the analysis module verifies the digital media at a remote location that is remote from the user.

16. The system according to claim 15, wherein receiving comprises receiving the captured digital media at the server at the remote location.

17. A method for verifying progress corresponding to one or more tasks assigned to a user, the method comprising:
providing, via a user device an option to the user for enabling capturing of digital media;
capturing digital media using a camera associated with the user device, wherein capturing digital media comprises recording a video of the user;
prior to recording the video of the user, communicating a first instruction to the user to perform a first action, wherein recording the video of the user comprises recording the user performing the first action;
while recording the video of the user, instructing the user to perform, in a specific area, one or more tasks assigned to the user,
wherein each of the one or more tasks is different from the first action, and
wherein recording the video of the user comprises recording the user performing the one or more tasks;
transmitting, from the user device to a server, the captured digital media for verification along with time stamp and data corresponding to a location of the user device, without allowing the user to modify the captured digital media, the captured digital media comprising the recorded video, the recorded video including the performing of the first action and the performing of the one or more second actions; and
verifying, by the server using a verification module, the captured digital media, thereby enabling verification of progress corresponding to the one or more tasks assigned to the user,
wherein verifying comprises:
accessing the captured digital media comprising the recorded video;
accessing the first instruction that was communicated to the user prior to recording the video of the user;
accessing the one or more tasks assigned to the user that the user was instructed to perform in the specific area while recording the video of the user;
reviewing the recorded video to determine, using an analysis module of the server and based on the first instruction that was communicated to the user prior to recording the video of the user, the location of the user device and the one or more tasks assigned to the user while recording the video of the user, whether the user performed the first action and the one or more tasks in the specific area; and
performing one of the following:
approving the captured digital media if the user performed the first action and the one or more tasks, or
rejecting the captured digital media if the user did not perform the first action and the one or more tasks.

18. A system for verifying progress corresponding to one or more tasks assigned to a user, the system comprising:
a user device; and
a server in communication with the user device, the server being configured to:
provide an interface via the user device that offers the user with an option for enabling capturing of digital media;
enable capturing digital media using a camera associated with the user device, wherein capturing digital media comprises recording video of the user;
while recording a video of the user and not before recording the video of the user, instruct the user to perform, in a specific area, one or more tasks assigned to the user;
receive from the user device the captured digital media for verification along with time stamp and data corresponding to a location of the user device, without allowing the user to modify the captured digital media, wherein the digital media is received by a verification module of the server, the captured digital media comprising the recorded video; and
verify the captured digital media by analyzing the captured digital media, thereby enabling verification of progress corresponding to the one or more tasks assigned to the user,
wherein verifying comprises:
accessing the captured digital media comprising the recorded video;
accessing the one or more tasks assigned to the user that the user was instructed to perform in the specific area while recording the video of the user;
reviewing the recorded video to determine, using an analysis module and based on the location of the user device and the one or more tasks assigned to the user while recording the video of the user, whether the user performed the one or more tasks in the specific area; and
performing one of the following:
approving the captured digital media if the user performed the one or more tasks, or
rejecting the captured digital media if the user did not perform the one or more tasks.

* * * * *